United States Patent
Lawrence et al.

(10) Patent No.: US 12,152,985 B2
(45) Date of Patent: Nov. 26, 2024

(54) METHOD AND APPARATUS FOR IMAGING A BIOLOGICAL SAMPLE BY TOTAL INTERNAL REFLECTION OF LIGHT IN THE GHz RANGE

(71) Applicant: QinetiQ Limited, Hampshire (GB)

(72) Inventors: Christopher Robert Lawrence, Farnborough (GB); Euan Hendry, Exeter (GB); Lauren Emily Barr, Exeter (GB); Samuel Martyn Hornett, Marston (GB); Peter Karlsen, Brabrand (DK)

(73) Assignee: QINETIQ LIMITED, Hampshire (GB)

( * ) Notice: Subject to any disclaimer, the term of this patent is extended or adjusted under 35 U.S.C. 154(b) by 412 days.

(21) Appl. No.: 17/614,467

(22) PCT Filed: Jun. 1, 2020

(86) PCT No.: PCT/EP2020/065115
§ 371 (c)(1),
(2) Date: Nov. 26, 2021

(87) PCT Pub. No.: WO2020/245069
PCT Pub. Date: Dec. 10, 2020

(65) Prior Publication Data
US 2022/0228982 A1   Jul. 21, 2022

(30) Foreign Application Priority Data

Jun. 7, 2019 (GB) ..................... 1908140
Mar. 17, 2020 (GB) ..................... 2003820

(51) Int. Cl.
*G01N 21/552* (2014.01)
*G01N 21/3581* (2014.01)

(52) U.S. Cl.
CPC ....... *G01N 21/552* (2013.01); *G01N 21/3581* (2013.01); *G01N 2201/0675* (2013.01)

(58) Field of Classification Search
CPC ............ G01N 21/552; G01N 21/3581; G01N 2201/0675; G01N 2201/0638;
(Continued)

(56) References Cited

U.S. PATENT DOCUMENTS 4,145,121 A * 3/1979 Hata ................ G02F 1/025
359/321
5,067,788 A * 11/1991 Jannson .......... G02F 1/195
385/2

(Continued)

FOREIGN PATENT DOCUMENTS

CN  109444085 A   3/2019
WO  2012087875 A1  6/2012

OTHER PUBLICATIONS

Written Opinion (WO) of the International Searching Authority (ISA) issued in International Application No. PCT/EP2020/065115.
(Continued)

*Primary Examiner* — Mohamed K Amara
(74) *Attorney, Agent, or Firm* — KENEALY VAIDYA LLP (57) ABSTRACT

Some embodiments are directed to a range of method for investigating a sample such as obtaining images and/or spectral information are described. The method includes a method for deriving structural information about a sample as a continuous function of the depth below the surface of the sample, a method for evaluating a part of the structure of a sample located between two interfaces within the sample, and a contrast enhancing method and apparatus which has a quick image acquisition time.

28 Claims, 2 Drawing Sheets

(58) Field of Classification Search
CPC ... G01N 21/359; G01N 21/4788; G02F 1/0136; G02F 1/025; G02F 1/011
See application file for complete search history.

(56) References Cited

U.S. PATENT DOCUMENTS

| | | | | |
|---|---|---|---|---|
| 5,220,403 | A * | 6/1993 | Batchelder | G01N 21/9505 356/450 |
| 5,911,018 | A * | 6/1999 | Bischel | G09F 9/305 385/11 |
| 7,033,542 | B2 * | 4/2006 | Archibald | G01N 21/552 422/50 |
| 8,730,468 | B2 * | 5/2014 | Messerchmidt | G01N 21/552 356/300 |
| 9,871,948 | B2 * | 1/2018 | Papadopoulos | G03H 1/2286 |
| 10,801,956 | B2 * | 10/2020 | Abdulhalim | G01N 21/774 |
| 10,908,441 | B2 * | 2/2021 | Moser | G02B 27/0172 |
| 2008/0251733 | A1 * | 10/2008 | Anderton | G01V 8/005 250/394 |
| 2009/0220184 | A1 * | 9/2009 | Goldring | G02F 1/011 385/12 |
| 2013/0126736 | A1 | 5/2013 | Kato et al. | |
| 2014/0097344 | A1 | 4/2014 | Hasebe et al. | |
| 2014/0099052 | A1 * | 4/2014 | Takaoka | G11B 7/128 385/2 |
| 2017/0329127 | A1 | 11/2017 | Liu et al. | |
| 2018/0164209 | A1 * | 6/2018 | Stiens | G01N 22/04 |
| 2019/0227293 | A1 * | 7/2019 | Bartal | G02B 21/06 |
| 2020/0387013 | A1 * | 12/2020 | Palani | G02F 1/292 |
| 2021/0072453 | A1 * | 3/2021 | Peng | G02F 1/1393 |

OTHER PUBLICATIONS

International Search Report (ISR) issued in International Application No. PCT/EP2020/065115.
Rayko I. Stantchev et al., "Compressed sensing with near-field THz radiation," supplementary material, optica, Supplementary Material, Optical Society of America, published Aug. 17, 2017, pp. 1-7.
Rayko I. Stantchev et al., "Compressed sensing with near-field THz radiation," optica, Letter, The Optical Society, vol. 4, No. 8, published Aug. 17, 2017, pp. 989-992.
Rayko Ivanov Stantchev et al., "Noninvasive, near-field terahertz imaging of hidden objects using a single-pixel detector," Supplementary Materials, Science Advances, published Jun. 3, 2016, Sci. Adv. 2, e1600190 (2016), 11 pages.
Samuel M. Hornett et al., "Subwavelength THz imaging of graphene photoconductivity," University of Exeter, Exeter, Devon, UK, pp. 1-7.
Samuel M. Hornett et al., "Subwavelength Terahertz Imaging of Graphene Photoconductivity," ACS Publication, Nano Letters, 2016, 16, pp. 7019-7024.
Lauren Barr et al., "Total internal reflection based super-resolution imaging for sub-IR frequencies—Supplementary Information," Optica, submitted Sep. 8, 2020, pp. 1-21.
I. R. Hooper et al., "High efficiency photomodulators for millimeter wave and THz radiation," Scientific Reports, (2019), 10 pages.
Lauren Barr et al., "Super-resolution imaging for sub-IR frequencies based on total internal reflection," Optica, vol. 8, No. 1 / Jan. 2021, pp. 88-94.
Lauren Barr et al., "Total internal reflection geometry for near-field imaging," 2020 45th International Conference on Infrared, Millimeter and Terahertz Waves, 1 page.
Lauren Barr et al., "Efficient mm-wave photomodulation via coupled Fabry-Perot cavities," J. Appl. Phys. 129, 033102 (2021), pp. 1-7.
Lauren Barr et al., "Engineered Silicon for Efficient mm-Wave and THz Modulators," University of Exeter, 2019 IEEE, 1 page.
Lauren Barr et al., "Efficient mm-wave photomodulation via coupled Fabry-Perot cavities," Supplementary Material, Nov. 27, 2020, pp. 1-7.
Rayko Ivanov Stantchev et al., "Noninvasive, near-field terahertz imaging of hidden objects using a single-pixel detector," Sci. Adv. 2016; 2 : e1600190, 7 pages.
I. R. Hooper et al., "High effciency photomodulators for millimeter wave and THz radiation," Supplementary Information, University of Exeter, Exeter, Devon, UK, pp. 1-11.
D. Scott Davis, "Multiplexed imaging by means of optically generated Kronecker products: 1. the basic concept," Applied Optics, vol. 34, No. 7, Mar. 1, 1995, pp. 1170-1176.

* cited by examiner

METHOD AND APPARATUS FOR IMAGING A BIOLOGICAL SAMPLE BY TOTAL INTERNAL REFLECTION OF LIGHT IN THE GHz RANGE

CROSS REFERENCE TO RELATED APPLICATION(S)

This application is a national phase filing under 35 C.F.R. § 371 of and claims priority to PCT Patent Application No. PCT/EP2020/065115, filed on Jun. 1, 2020, which claims the priority benefit under 35 U.S.C. § 119 of British Patent Application Nos. 1908140.5 and 2003820.4, filed on Jun. 7, 2019 and Mar. 17, 2020 respectively, the contents of each of which are hereby incorporated by reference in their entireties.

BACKGROUND

Some embodiments of the presently disclosed subject matter relate to a method of imaging an object and an apparatus for carrying out said imaging. In particular, some embodiments of the presently disclosed subject matter relates to a method for imaging an object including biological material such as a tumour and apparatus for carrying out said method.

Intraoperative techniques cannot currently provide an accurate assessment of cancer tumour margins, particularly breast cancer. Without an accurate picture between the margin of the tumour and healthy tissue, surgeons struggle to be sure they have removed the entire tumour during surgery often erring on the side of caution and also removing healthy body tissue.

The method of assessing margins currently employed by most surgeons is palpation, i.e. the use of touch to assess if tissue is a palpable lump. This is often supplemented by intraoperative x-ray. Neither of these methods is particularly effective for assessing the specimen for involved or close margins and as a result the rate of close or involved margins is high. For the purposes of some embodiments of the presently disclosed subject matter a close margin is defined as <2 mm of healthy tissue.

It is recognised that it would be useful to have more accurate techniques of imaging so that surgeons could make more informed and more accurate decisions during surgery and remove as little healthy tissue as possible while at the same time be sure that all or most of the tumour has been successfully removed.

There is an ongoing need for techniques which address the afore-mentioned problems.

It is known to use frequency ranges in the THz region of the spectrum for imaging. However, it is not known for use as a margin analysis tool in connection with the problems mentioned herein. Aside from the economic issues, it has proven difficult to develop detector array technology in the THz band. Existing imaging approaches using the THz region of the spectrum rely on raster-scanning thus making real-time imaging over a large field of view extremely difficult. In addition, it has hitherto proven extremely challenging to implement imaging of tumours in this region since absorption contrast is typically only observed at the lateral edges of a tumour and margins at the top and bottom remain undetermined and poorly defined.

While the use of lower frequency wave bands such as mm-waves may address some of these problems, potential problems associated with the use of this wave band remain due, at least partly, to the diffraction limit. Hence, the current understanding and perception is that the afore-mentioned problems will not be sufficiently addressed by the use of mm-waves (typically defined to be in the range of about 30 GHz to about 300 GHz and denoted to be Extra High Frequency or EHF covering wavelengths from 1 mm to 10 mm). Some embodiments of the presently disclosed subject matter discloses that a non-standard imaging approach (possibly based on the use of mm-waves or cm-waves) is advantageous in providing the resolution and definition that can be required while accessing the depth information which can be critical for margin determination in imaging objects, particularly in the medical field. Cm-waves are typically defined to be in the range of about 3 GHz to less than 30 GHz.

SUMMARY

Some embodiments of the presently disclosed subject matter addresses at least some of the afore-mentioned problems by proposing a strategy which adopts a total internal reflection (TIR) imaging approach (or geometry) for real-time margin assessment during, inter alia, cancer surgery. Advantageously, the method and associated apparatus does not have to require an array of detectors.

In accordance with some embodiments of the presently disclosed subject matter, an electromagnetic radiation (possibly a mm-wave or cm-wave radiation) impinges on or is incident on a sample, which includes an object such as body tissue, through a non-absorbing medium, such as a prism, onto a spatial light modulator (SLM), such as a silicon wafer. Possibly the SLM, e.g. silicon wafer, has been passivated to increase its photoconductivity. For the purposes of some embodiments of the presently disclosed subject matter, mm wave radiation is taken to mean radiation in the range of about 30 GHz to about 300 GHz and cm-wave radiation is taken to cover about 3 GHz to less than 30 GHz, for example about 10 GHz to less than 30 GHz. Any reference to electromagnetic radiation in connection with some embodiments of the presently disclosed subject matter is taken to include mm-wave radiation and cm-wave radiation.

The reflection of the electromagnetic radiation from the SLM is spatially modulated by a visible or near infrared light source. By visible light source is taken to mean light possessing a wavelength of about 380 nm to about 780 nm. By near infrared light source is taken to mean light possessing a wavelength of above 780 nm to about 2,500 nm. Spatial modulation may be provided by electromagnetic radiation possessing a band gap energy greater than about 1.1 eV. In this arrangement, the SLM is nominally reflective to incident radiation (e.g. mm-wave or cm-wave). In regions of the SLM which are illuminated by visible light, the local conductivity of the SLM increases thus modulating the electromagnetic radiation at these locations.

The visible or near infrared light source may be spatially patterned. This may be done using a digital micro-mirror device (e.g. corresponding to, or akin to, an active element of projectors). An image of the object may be reconstructed by rapidly modulating the reflected electromagnetic radiation intensity which is subsequently displayed on the SLM and the radiation which is reflected and recorded for each pattern. By way of example, the electromagnetic radiation intensity may be (rapidly) modulated with a set of Hadamard patterns.

Accordingly, some embodiments of the presently disclosed subject matter provides a method of imaging an object, including:

positioning an object to be imaged on a spatial light modulator (SLM), wherein said SLM is disposed or positioned on a waveguide to form an interface therewith;

generating electromagnetic radiation;

directing the electromagnetic radiation through the waveguide wherein the electromagnetic radiation is guided through the waveguide by total internal reflection and the electromagnetic radiation impinges on the object to be imaged at the SLM/waveguide interface and is reflected therefrom;

spatially modulating the reflected electromagnetic radiation by visible light from a visible light source or by near infrared light from a near infrared source;

detecting the spatially modulated reflected electromagnetic radiation;

reconstructing an image of the object from the detected modulated reflected electromagnetic radiation.

Spatial modulation of the reflected electromagnetic radiation may be achieved by spatially patterning the visible light or near infrared light. Alternatively, spatial modulation may be provided by electromagnetic radiation possessing a band gap energy greater than about 1.1 eV.

Spatial modulation may be achieved by patterning selected areas of the waveguide. For example, areas of the waveguide may be treated so that they are conductive when visible or near infrared light is incident thereon. The treated areas of the waveguide may be selectively illuminated by the incident visible or near infrared light.

The image may be generated of an object placed in an evanescent field region extending from the SLM opposite the SLM/waveguide interface. The evanescent field may be described as being above the SLM. In this case, the evanescent field is a non-propagating but oscillating electric field, bound to the SLM/waveguide interface and extending in to the object or sample being imaged or under scrutiny. The evanescent field is generated under conditions of attenuated total reflection (ATR) at the waveguide's surface.

The object to be imaged may be positioned directly on the waveguide/SLM or may be positioned in a receptacle such as a tray which is positioned on the SLM. The receptacle possesses the appropriate optical properties, e.g. is transparent to visible light or near infrared light and incident electromagnetic radiation.

Possibly, the radiation generated and used in the method (and suitable for use in the apparatus) in accordance with some embodiments of the presently disclosed subject matter is mm-wave radiation or cm-wave radiation. In particular, the electromagnetic radiation may possess a frequency of about 10 GHz to about 100 GHz, or to about 150 GHz, or about 10 GHz to about 50 GHz, or about 30 GHz to about 100 GHz, or about 30 GHz to about 50 GHz or about 10 GHz to about 30 GHz or less than 30 GHz, or about 10 GHz to about 20 GHz, or about 10 GHz to about 15 GHz. Possibly, the electromagnetic radiation may possess a frequency of about 10 GHz to about 20 GHz or to about 15 GHz. The radiation generated may be mm-wave radiation and therefore generated by a source of mm-wave radiation. The mm-wave radiation may be about 1 mm to about 10 mm. The radiation generated may be cm-wave radiation and therefore generated by a source of cm-wave radiation. The radiation generated may be polarised, or unpolarised, or part polarised. The radiation generated may be linearly polarised. In linear polarisation, (also known as plane polarisation), the electric field vector is confined to oscillate in a single plane that lies along the direction of propagation. Polarised radiation may be generated by passing radiation through a polariser (e.g. a polarising filter), which allows waves of one polarisation to pass through.

The electromagnetic radiation generated may be transverse electric (TE) polarised or it may be transverse magnetic (TM) polarised (or a combination thereof). The use of polarised radiation, or the choice of TM or TE radiation may be used to improve the contrast of the image generated and/or the signal to noise ratio. Alternating between TM and TE polarised radiation may also be employed. This may also lead to improved contrast of the image.

In addition, or alternatively, the reflected electromagnetic radiation may be polarised (or unpolarised) as described above in relation to the radiation generated.

Some other embodiments of the presently disclosed subject matter provides an apparatus for imaging an object. The apparatus is suitable for carrying out the method in accordance with some embodiments of the presently disclosed subject matter. Accordingly, the apparatus in accordance with some embodiments include:

a spatial light modulator positioned on the surface of a waveguide forming an interface therewith;

a source of electromagnetic radiation positioned to direct electromagnetic radiation through the waveguide so that the radiation is totally internally reflected through the wave guide and impinges on the waveguide spatial light modulator interface;

a source of visible light or near infrared light positioned to illuminate sections of the waveguide spatial light modulator interface;

means for spatially patterning the visible light or near infrared light;

a detector to detect the electromagnetic radiation exiting the light guide.

In use, a sample is positioned on a surface of the SLM which does not form the interface with the waveguide. The sample may be placed in a receptacle which is itself positioned on the SLM.

The visible light or near infrared light may be spatially patterned, for example using a set of Hadamard patterns.

The SLM may be a silicon wafer. The silicon wafer may be passivated to increase the photoconductivity. Passivation may involve coating the wafer with dielectric layers that reduce the density of traps (imperfections that restrict the movement of charges) at the surface, or with dielectric layers with a fixed charge that drive one type of charge carrier, electrons or holes, away from the surface. The passivation process may involve an annealing step in a suitable gas environment to activate the passivation. The SLM may be passivated with an oxide or a nitride. A coating of an oxide or nitride may be applied to the SLM. The coating may be applied thermally e.g. via atomic layer deposition, or in a wet process.

The image generated by the apparatus is generated on the surface of the SLM opposite the SLM/waveguide interface and within an evanescent field region.

The depth of field may be tuned by varying the angle or the frequency of the incident electromagnetic radiation.

A source of visible light or near infrared light may be positioned to illuminate sections of the waveguide spatial light modulator interface. The visible or near infrared light may strike the SLM and create a pattern where it strikes selected photosensitive regions of the SLM so that they become opaque or less transparent when illuminated. The selected photosensitive regions of the SLM may have been treated to modify the optical properties of said regions. The electromagnetic radiation may strike the SLM and encounter the pattern of transparent and opaque regions. The pattern formed on the SLM tailors the interaction of an associated evanescent field with the sample, thereby modulating the electromagnetic radiation.

The waveguide may be a dielectric prism.

Though some embodiments of the presently disclosed subject matter may tend to focus on the imaging of an object wherein the object is biological material or tissue such as a tumour, the object may include any object, e.g. dielectric medium into which the electromagnetic radiation may penetrate, with the aim of determining variations in the dielectric permittivity of the sample, such as regions of differing water content (e.g. a tumour in a sample of flesh) regions of high permittivity in a predominantly low-permittivity sample (e.g. metallic or ceramic shrapnel in flesh or particles in a foodstuff), or regions of low permittivity in a higher permittivity medium (e.g. air bubbles in a polymeric material, or cracks in a fibre-reinforced composite). Biological material may include any material from or derived from a biological system.

The object may be a biological material. For example, the object may be bodily fluid or bodily tissue. For example, the bodily fluid may be blood or a component of blood. The blood or component of blood may be covered by, encased by or located underneath clothing or protective clothing such as armour wherein the clothing or armour may be made of a fabric material and/or ceramic material.

There are numerous advantages associated with some embodiments of the presently disclosed subject matter. For example, some embodiments of the presently disclosed subject matter provides strong imaging contrast between cancerous tumours and healthy tissue, more specifically between fatty tissue, healthy protein and cancerous tumour fatty tissue.

Radiation in the mm-wave and cm-wave spectral bands is safe, non-ionising and non-destructive (and is therefore safer than using x-rays for example). These frequencies can pass through fatty tissues that normally scatter or absorb infrared and visible radiation while giving rise to useful contrast in protein rich tissues for cancer imaging.

The method in accordance with the invention affords other advantages. For example, it is suitable for use with existing procedures for analysing excised tissues such as breast samples. In particular, it is suitable for use in conjunction with Raman measurement of excised samples.

Compared with other imaging techniques which utilise for example the THz region the costs are significantly lower.

The lateral image resolution is determined by the optical modulation length scale rather than the electromagnetic wave (e.g. mm-wave or cm-wave) diffraction limit and advantageously fine detail may be observed in images down to a few hundred micrometres. Fine contrast is observed between different tissues, e.g. between fat rich and protein rich material (such as muscle).

The signal to noise ratio of the resulting images is boosted by orders of magnitude over conventional raster scanning methods.

Real time imaging is achievable. For example images may be acquired with greater than about 4000 pixels in less than about 600 ms, for example in about 500 ms. This may be improved by optimising the computation and signal processing by about three times.

Advantageously, the field of view obtained by the methods in accordance with some embodiments of the presently disclosed subject matter is also rapidly adjustable without increasing the imaging time.

The measurement approach in accordance with some embodiments of the presently disclosed subject matter allows for a surgeon to determine if a >2 mm margin across >80% of an excised tumour has been achieved. This allows for better assessment of the surgery endpoint and if and where additional margin may be required. A good margin tool reduces the need for secondary surgery, while also improving recovery times, cancer reoccurrence and metastasis.

Though some embodiments of the presently disclosed subject matter may tend to focus on a method of imaging objects which include body tissue, including tumours, some embodiments of the presently disclosed subject matter discloses that the method of imaging and the arrangement of features means that the method is also of use in imaging other objects and that wavelengths may be used which may not be optimal for medical applications. In addition, the method of imaging may also relate to a method of imaging and detecting an object.

The incident radiation may be generated by an oscillator, e.g. a mm-wave oscillator or a cm-wave oscillator. The power of the oscillator may be about 0.1 mW to about 100 mW. The incident radiation may be in the region of about 10 GHz to about 100 GHz, or about 10 GHz to about 50 GHz, or about 30 GHz to about 50 GHz or about 10 GHz to about 15 GHz or to about 20 GHz. The method is suitable for use with any suitable electromagnetic radiation source and detector, including by way of example a wave oscillator, a gunn diode or a free electron laser.

The radiation generated may be polarised, or unpolarised, or part polarised. The radiation generated may be linearly polarised. In linear polarisation, the electric field and magnetic field oscillate in a single direction. Polarised radiation may be generated by passing radiation through a polariser (e.g. a polarising filter), which allows waves of one polarisation to pass through. The radiation generated may be partially polarised.

For the case when polarised light is incident at an interface between two materials of different refractive index, the behaviour may be determined in accordance with how much of the electric field crosses the interface. Two polarisations orthogonal to each other may be defined. In a first case, the electric vector is parallel to the interface and the magnetic vector crosses it. This is referred to as Transverse Electric (TE) polarisation. In a second case, the magnetic vector is parallel to the interface and the electric vector crosses it. This is referred to as Transverse Magnetic (TM) polarisation. In some embodiments of the presently disclosed subject matter, the electromagnetic radiation generated may be TE polarised or it may be TM polarised. The use of polarised radiation, or the choice of TM or TE radiation may be used to improve the contrast of the image generated and/or the signal to noise ratio. Alternating between the two polarisations (TM and TE) may also highlight regional differences in an image by oscillating between the two states and hence their contrast values.

A polariser or polarising filter may be positioned to allow the electromagnetic radiation which is generated to pass through the polariser and before the electromagnetic radiation impinges on the waveguide spatial light modulator interface. As such, the polariser may be positioned between the source of electromagnetic radiation and the waveguide. This polariser may be referred to herein as a first polariser.

Alternatively, or in addition, a polariser or polarising filter may be positioned to allow the electromagnetic radiation exiting the light guide to pass there through. This alternative or further polariser may be referred to herein as the exit polariser or the second polariser, or the further polariser.

The optical modulation may be performed with a digital micromirror device and a light source, for example an LED light source, or a near infrared light source.

The spatial light modulator may be a silicon wafer including a passivation layer deposited thereon. The passivation layer may be applied by atomic layer deposition. By minimising the scattering of the optical modulator some embodiments of the presently disclosed subject matter seeks to minimise limitations in the field of view.

The waveguide is suitable for totally internally reflecting incident radiation. The waveguide may be a dielectric material. The waveguide may be a dielectric prism.

For example, the waveguide may be a polymer or glass. The waveguide may be in the form of a prism and may be formed by a 3D printing technique. The waveguide may be made from a low loss polymer. By minimising the amount of loss of the incident radiation some embodiments of the presently disclosed subject matter seeks to minimise limitations in the field of view. Polymer or plastic materials can be preferred over glass. Suitable polymers are polyolefin, for example polypropylene (PP) or polyethylene (PE); polystyrene and TOPAS.

TOPAS is a cyclic olefin copolymer, commonly used in medical applications due to its high optical quality, relatively low mass and affordability relative to alternatives such as quartz glass. Possible polymers are polypropylene, polystyrene and TOPAS. Two part epoxy materials may also be used, including if a cast material may be required in order to maintain high optical quality and by avoiding machining. A suitable example of a two part epoxy is commercially available resin RS-M135 and the hardeners RS-MH134 and RS-MH137 which are commercially available from PRF Composite Materials. Any of the polymers mentioned for use in accordance with some embodiments of the presently disclosed subject matter may be present as a homopolymer or a copolymer.

Figure 2:
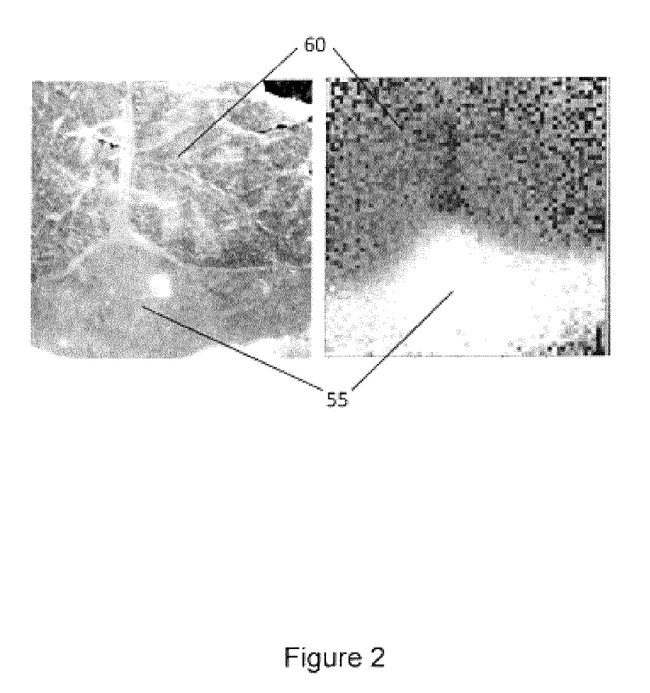
FIG. 2 is an image of porcine tissue taken using a demonstrator imager operating at 140 GHz and in accordance with Example 1. The left hand image is a photograph and the right hand image is a THz generated image.

Without wishing to be limited by theory, some embodiments of the presently disclosed subject matter discloses that the lateral image resolution is determined by the optical modulation length scale rather than the mm-wave diffraction limit and, advantageously, fine detail may be observed in images down to a few hundred micrometres. In FIG. 2, (generated in connection with Example 1), fatty regions are almost completely transparent to mm-waves while absorption in protein rich regions varies with water density. The variation in water content is similar to that expected in regions surrounding breast tumours.

In order to obtain an image, a total of "N" THz transmission measurements for "N" distinct spatial encoding masks may be recorded. In matrix notation, this can be represented as $\phi=W\Psi$ where $\phi$ is a vector of the sequential measurements made, W is a measurement matrix where the $(i, j)^{th}$ entry determines the value of the $j^{th}$ mask pixel in the $i^{th}$ measurement and $\Psi$ is an N-pixel image of the object. The image can be obtained by inverse matrix multiplication: $\Psi=W-1\phi$, but other methods may be used if the matrix cannot be inverted. Reference may be made to Eldar, Y. C. and Kutyniok, G., Compressed Sensing: Theory and Applications (Cambridge University Press, 2012), the contents of which are incorporated herein in their entirety.

The binary transmission masks used in accordance with some embodiments of the presently disclosed subject matter may have either opaque or transmissive pixels i.e. are described by 1s and 0s. In order to preserve the orthonormality of Hadamard matrices, which are composed of +1s and −1s, sequential measurements may be carried out of a mask directly followed by its inverse and the difference recorded in THz transmission for these measurements via a lock-in amplifier. This differential measurement is described by matrices with elements of +1 and −1. Reference may be made to Scott, D. D., Multiplexed imaging by means of optically generated Kronecker products: 1. The basic concept. Applied Optics 34, 1170-1176 (1995), the contents of which are incorporated herein in their entirety.

Figure 1:
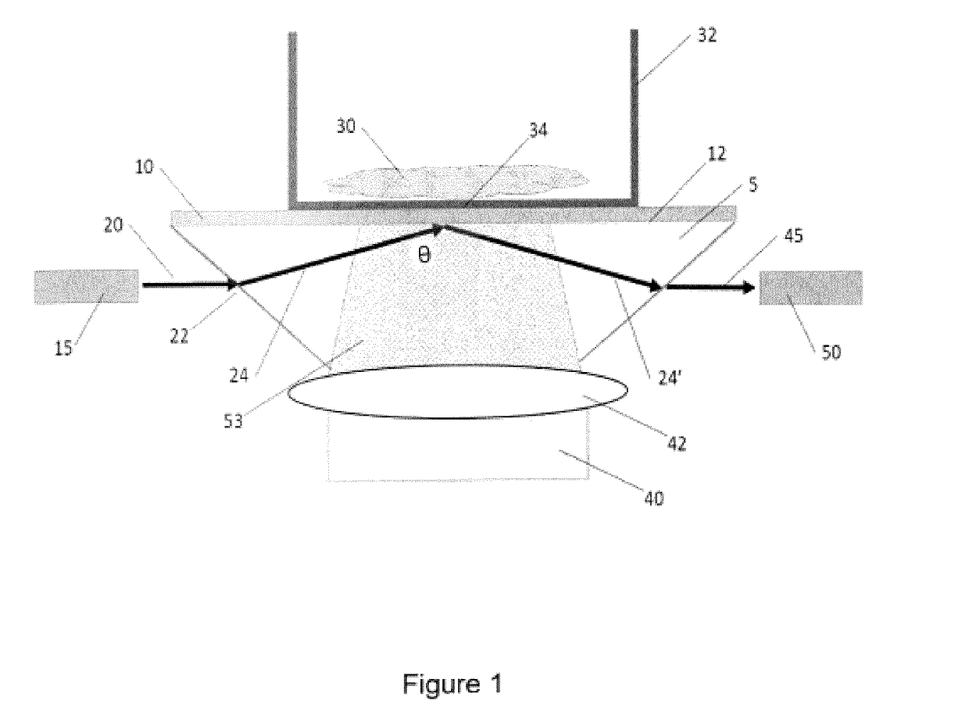
FIG. 1 is a simplified schematic illustration of the method in accordance with some embodiments of the presently disclosed subject matter.

In FIG. 1, a spatial light modulator (10) is shown positioned on a waveguide (5). The waveguide shown in FIG. 1 is in the form of a dove prism and is made from polymer in the embodiment shown. An SLM/waveguide interface is formed at (12). A source (15) of electromagnetic radiation (e.g. mm-wave) which may be an oscillator is shown emitting a wave (20) which is incident on the waveguide (5) at (22). As the wave (20) enters the waveguide it is guided by total internal reflection indicated by the trace (24). The wave (24) impinges on a sample (30) which may be held in a receptacle (32) positioned on a surface (34) of the SLM opposite the SLM/waveguide interface (12). The SLM may be a silicon wafer which is passivated to increase its photoconductivity. The reflection of the wave (24) from the SLM is indicated at (24'). In the embodiment shown this reflected wave is spatially modulated via light from a light source indicated at (40). The light source may typically be an LED light source, for example about 1 W power and is imaged on to the SLM by a lens (42), typically a long working distance lens. In the embodiment shown, the SLM is nominally reflective to radiation. However in regions which are illuminated from light from the light source the local conductivity of the SLM increases, thus modulating the reflected radiation at these locations. The visible light is spatially patterned (indicated at 53), for example using a (standard) digital micro-mirror device. An image of the sample (30) is reconstructed by modulating the intensity of the wave. In the embodiment shown this is schematically represented with a set of Hadamard patterns. The radiation which is reflected may be recorded as it exits the waveguide (45) by a radiation detector (50).

When the wave is reflected at the waveguide-object interface an evanescent field (not shown) projects into the object (30). Without wishing to be bound by theory, some embodiments of the presently disclosed subject matter discloses that it is the differential attenuation of this evanescent field that provides contrast to the image. The image acquired is determined by the average material respond in the evanescent field region above the waveguide. The physical thickness of this region can be tuned by both the incident angle (indicated as theta) in FIG. 1 and the frequency of the radiation wave. The use of frequencies of radiation possibly in the range of about 10 GHz to about 50 GHz allow for the targeting of evanescent decay length to match margin guidelines.

In FIG. 1, a polariser (not shown) may be located in between the source (15) of electromagnetic radiation and the waveguide (5) so that the electromagnetic radiation is polarised, e.g. linearly polarised, before it impinges on the sample (30), for example the polariser may be positioned in between the source (15) and where the wave (20) is incident on the waveguide (5) at (22). Alternatively or in addition, a polariser (not shown) may be positioned so that the reflected wave (24') passes there through before it is incident on the radiation detector (50). This alternative or additional polariser may be positioned in between where the reflected wave (24') exits the waveguide (5) and the radiation detector (50). The linearly polarised electromagnetic radiation may be TM polarised or TE polarised for any individual or combination of polarisers which may be present. The linearly polarised electromagnetic radiation may include alternating between TM polarised radiation and TE polarised radiation for any individual or combination of polarisers which may be present.

One of ordinary skill in the art realizes that some embodiments of the presently disclosed subject matter is by no means limited to the exemplary embodiments described above. On the contrary, many modifications and variations are possible within the scope of the appended claims.

EXAMPLES

Example 1

A tissue sample, in this case porcine flesh (left-hand image in FIG. 2), was placed in a receptacle situated on the uppermost surface of a treated silicon wafer that acted as a Spatial Light Modulator (SLM). The SLM was in intimate contact with a waveguide (in this case, a Dove prism) which refracted the incident radiation (140 GHz) from a terahertz source. Evanescent fields were generated, extending a few wavelengths into the region above the prism where the radiation underwent total internal reflection (TIR) at the prism's face, before being redirected towards a detector.

Optical illumination was generated by a 623 nm, 3.7 W diode (Solis, Thorlabs). This was patterned (spatially modulated) via the use of a digital micromirror device (in this case, a V-7001 from Vialux) to create a patterned light field. This combination of micromirror array and diode corresponds to the light source (40) in FIG. 1. The light was made incident upon a lens which reimaged the digital micromirror pattern onto the smaller rectangular face of the Dove prism, transmitting it to the SLM. The pattern of light generated highly electrically conductive (opaque) regions on the silicon wafer where it was illuminated, in this case in the form of Hadamard patterns.

The 140 GHz radiation striking the SLM was tailored by the conductive pattern, thus altering the aforementioned evanescent fields. By projecting multiple light patterns onto the SLM, an image of the sample was generated, revealing the contrasting regions of high and low water content (muscle and fat, respectively). These are presented in the right-hand image of FIG. 2. The fatty tissue is indicated at (55) and the protein (or muscle) tissue at (60).

The presently disclosed subject matter includes the subject-matter in the following paragraphs:

A method of imaging an object, including:
    positioning an object to be imaged on a spatial light modulator (SLM), wherein said SLM is disposed or positioned on a waveguide to form an interface therewith;
    generating electromagnetic radiation;
    directing the electromagnetic radiation through the waveguide wherein the electromagnetic radiation is guided through the waveguide by total internal reflection and the electromagnetic radiation impinges on the object to be imaged at the SLM/waveguide interface and is reflected therefrom;
    spatially modulating the reflected electromagnetic radiation by visible light from a visible light source or by near infrared light from a near infrared source;
    detecting the spatially modulated reflected electromagnetic radiation;
    reconstructing an image of the object from the detected modulated reflected electromagnetic radiation.

A method according to any of the embodiments above, wherein the electromagnetic radiation generated is about 10 GHz to about 100 GHz.

A method according to any of the embodiments above, wherein the electromagnetic radiation generated is about 10 GHz to about 50 GHz, for example about 10 GHz to about 20 GHz or about 10 GHz to about 15 GHz.

A method according to any of the embodiments above, wherein the spatial light modulator includes or can consist of a silicon wafer which has optionally been passivated.

A method according to any of the embodiments above, wherein the silicon wafer has been coated or treated with an oxide or a nitride.

A method according to any of the embodiments above, wherein the waveguide is a dielectric prism.

A method according to any of the embodiments above, wherein the waveguide includes or can consist of a polymer or glass.

A method according to any of the embodiments above, wherein the polymer is selected from polyolefin, for example polypropylene (PP) or polyethylene (PE), or a cyclic olefin copolymer, or the polymer is polystyrene.

A method according to any of the embodiments above, wherein the object is biological material, for example biological tissue such as a tumour.

A method according to any of the embodiments above, wherein the object is blood which optionally may be (substantially) encased or (substantially) covered by fabric or a ceramic material.

A method according to any of the embodiments above, wherein the reflected electromagnetic radiation is spatially modulated by visible light or near infrared light by spatially patterning the visible light or near infrared light, for example using a set of Hadamard patterns.

An apparatus for imaging an object, wherein the apparatus includes:
    a spatial light modulator positioned on the surface of a waveguide forming an interface therewith;
    a source of electromagnetic radiation positioned to direct electromagnetic radiation through the waveguide so that the electromagnetic radiation is totally internally reflected through the wave guide and impinges on the waveguide spatial light modulator interface;
    a source of visible light or near infrared light positioned to illuminate sections of the waveguide spatial light modulator interface;
    means for spatially patterning the visible light or near infrared light;
    a detector to detect the electromagnetic radiation exiting the light guide.

An apparatus according to any of the embodiments above wherein the source of electromagnetic radiation in use generates electromagnetic radiation of about 10 GHz to about 100 GHz, or about 10 GHz to about 20 GHz, or about 10 GHz to about 15 GHz.

An apparatus according to any of the embodiments above, wherein the spatial light modulator includes or can consist of a silicon wafer which has optionally been passivated, for example with an oxide or a nitride.

An apparatus according to any of the embodiments above, wherein the waveguide is a dielectric prism which may include or can consist of polymer or glass.

An apparatus according to any of the embodiments above, wherein the polymer is selected from polyolefin, for example polypropylene (PP) or polyethylene (PE), or a cyclic olefin copolymer, or the polymer is polystyrene.

Additionally, variations to the disclosed embodiments can be understood and effectuated by one of ordinary skill in practicing the presently disclosed subject matter, from a study of the drawings, the disclosure, and the appended claims. In the claims, the word "including" does not exclude other elements or steps, and the indefinite article "a" or "an" does not exclude a plurality. The mere fact that certain features are recited in mutually different dependent claims does not indicate that a combination of these features cannot be used to advantage.

The invention claimed is:

1. A method of imaging an object, the method comprising:
    positioning an object to be imaged on a spatial light modulator (SLM), wherein the SLM is disposed or positioned on a waveguide to form an interface therewith;
    generating electromagnetic radiation;
    directing the electromagnetic radiation through the waveguide wherein the electromagnetic radiation is guided through the waveguide by total internal reflection such that the electromagnetic radiation impinges on the object to be imaged at the SLM/waveguide interface and is reflected therefrom;
    illuminating the SLM by visible light from a visible light source or by near infrared light from a near infrared source to spatially modulate the electromagnetic radiation at the SLM;
    detecting the spatially modulated reflected electromagnetic radiation; and
    reconstructing an image of the object from the detected modulated reflected electromagnetic radiation.

2. The method according to claim 1, wherein the electromagnetic radiation generated has a frequency in the range from 10 GHz to about 100 GHz.

3. The method according to claim 1, wherein the electromagnetic radiation generated has a frequency in the range from 10 GHz to about 50 GHz.

4. The method according to claim 1, wherein the spatial light modulator includes a silicon wafer, or a passivated silicon wafer.

5. The method according to claim 4, wherein the silicon wafer has been coated or treated with at least one of an oxide or a nitride.

6. The method according to claim 1, wherein the waveguide is a dielectric prism.

7. The method according to claim 1, wherein the waveguide includes a polymer or glass.

8. The method according to claim 7, wherein the polymer is selected from the group consisting of polyolefin, polypropylene (PP) or polyethylene (PE), or a cyclic olefin copolymer, or the polymer is polystyrene.

9. The method according to claim 1, wherein the object is biological material, including biological tissue such as a tumour.

10. The method according to claim 1, wherein the object is blood including blood (substantially) encased or (substantially) covered by fabric or a ceramic material.

11. The method according to claim 1, wherein the reflected electromagnetic radiation is spatially modulated by visible light or near infrared light by spatially patterning the visible light or near infrared light, and including using a set of Hadamard patterns.

12. The method according to claim 1, wherein the generated electromagnetic radiation is polarised.

13. The method according to claim 1, wherein the generated electromagnetic radiation is linearly polarised.

14. The method according to claim 1, wherein the generated electromagnetic radiation is transverse electric (TE) polarised.

15. The method according to claim 1, wherein the generated electromagnetic radiation is transverse magnetic (TM) polarised.

16. The method according to claim 1, wherein the generated electromagnetic radiation alternates between transverse electric (TE) polarised radiation and transverse magnetic (TM) polarised polarisation.

17. The apparatus according to claim 1, further comprising a polarising filter positioned to allow the electromagnetic radiation exiting the waveguide to pass there through.

18. The apparatus according to claim 17, wherein the polarising filter positioned to allow the electromagnetic radiation exiting the waveguide to pass there through linearly polarises the electromagnetic radiation.

19. The apparatus according to claim 18, wherein the polarising filter produces transverse electric (TE) or transverse magnetic (TM) polarisation or alternating TE and TM radiation.

20. An apparatus for imaging an object, the apparatus comprising:
    a waveguide;
    a spatial light modulator (SLM) positioned on the surface of the waveguide forming an interface therewith, wherein the SLM is suitable for supporting the object to be imaged thereon,
    the interface constituting a SLM-waveguide interface;
    a source of electromagnetic radiation positioned to direct electromagnetic radiation through the waveguide so that the electromagnetic radiation is totally internally reflected through the wave-guide and impinges the SLM-waveguide interface and is reflected therefrom;
    a source of visible light or near infrared light positioned to illuminate sections of the SLM;
    a device configured to provide spatially patterning of the visible light or near infrared light so as to spatially modulate the electromagnetic radiation at the SLM; and
    a detector configured to detect the reflected modulated electromagnetic radiation exiting the waveguide and to reconstruct an image of the object from the reflected modulated electromagnetic radiation.

21. The apparatus according to claim 20, wherein the source of electromagnetic radiation in use generates electromagnetic radiation having a frequency in the range from 10 GHz to about 100 GHz.

22. The apparatus according to claim 20, wherein the spatial light modulator includes a silicon wafer or a silicon wafer which has been passivated with an oxide or a nitride.

23. The apparatus according to claim 20, wherein the waveguide is a dielectric prism which includes polymer or glass.

24. The apparatus according to claim 23, wherein the polymer is selected the group consisting of polyolefin, polypropylene (PP) or polyethylene (PE), or a cyclic olefin copolymer, or the polymer is polystyrene.

25. The apparatus according to claim 20, further comprising a polarising filter positioned to allow the electromagnetic radiation to pass there through before the electromagnetic radiation impinges on the SLM-waveguide interface.

26. The apparatus according to claim 25, wherein the polarising filter linearly polarises the electromagnetic radiation.

27. The apparatus according to claim 26, wherein the polarising filter produces TE or TM polarisation or can be used to produce alternating transverse electric (TE) and transverse magnetic (TM) radiation.

28. The apparatus according to claim 20, wherein the apparatus further comprises a polarising filter which is positioned between the source of electromagnetic radiation and the waveguide.

* * * * *